(12) United States Patent
LeMay et al.

(10) Patent No.: US 11,188,639 B2
(45) Date of Patent: Nov. 30, 2021

(54) SYSTEM, METHOD AND APPARATUS FOR AUTOMATIC PROGRAM COMPARTMENTALIZATION

(71) Applicant: Intel Corporation, Santa Clara, CA (US)

(72) Inventors: Michael LeMay, Hillsboro, OR (US); Ye Zhuang, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 159 days.

(21) Appl. No.: 16/040,193

(22) Filed: Jul. 19, 2018

(65) Prior Publication Data

US 2019/0050558 A1 Feb. 14, 2019

(51) Int. Cl.

| | |
|---|---|
| *G06F 21/53* | (2013.01) |
| *G06F 21/62* | (2013.01) |
| *G06F 12/14* | (2006.01) |
| *G06F 8/70* | (2018.01) |
| *G06F 8/41* | (2018.01) |
| *G06F 21/54* | (2013.01) |

(52) U.S. Cl.
CPC ............... *G06F 21/53* (2013.01); *G06F 8/41* (2013.01); *G06F 8/70* (2013.01); *G06F 12/14* (2013.01); *G06F 21/54* (2013.01); *G06F 21/62* (2013.01); *G06F 2221/2149* (2013.01)

(58) Field of Classification Search
None
See application file for complete search history.

(56) References Cited

U.S. PATENT DOCUMENTS

| | | | |
|---|---|---|---|
| 6,175,916 B1 * | 1/2001 | Ginsberg | G06F 9/4484 712/228 |
| 7,730,318 B2 * | 6/2010 | Kurien | G06F 21/53 713/176 |

(Continued)

OTHER PUBLICATIONS

Carr et al.; "DataShield: Configurable Data Confidentiality and Integrity"; 2017; Retrieved from the Internet https://dl.acm.org/doi/pdf/10.1145/3052973.3052983; pp. 1-12, as printed. (Year: 2017).*

(Continued)

*Primary Examiner* — Michael W Chao
(74) *Attorney, Agent, or Firm* — Spectrum IP Law Group LLC

(57) ABSTRACT

The disclosed embodiments relate to system, method and apparatus to compartmentalize information in a program so as to protect against malware. In one embodiment, the disclosed provides a compiler that is enhanced to automatically define multiple compartments within a program based on the data sets that they access. The disclosed embodiments may be implemented at a compiler and certain embodiments may be referred to as compartmentalizing compiler. For each data set, an exemplary compartmentalizing compiler separates program elements that need direct access to the data set from those that do not and it defines a boundary around the data set and the program elements that need to access it. In certain embodiments, other portions of the program may still need to invoke the compartment. Thus, the disclosure also generates interface routines to copy data back and forth through the compartment boundary.

27 Claims, 6 Drawing Sheets

(56) References Cited

U.S. PATENT DOCUMENTS

| | | | | |
|---|---|---|---|---|
| 9,189,375 | B1* | 11/2015 | Bastien | G06F 11/3688 |
| 10,671,411 | B2* | 6/2020 | Pesarese | G06F 9/465 |
| 10,810,305 | B2* | 10/2020 | Zhang | G06F 12/14 |
| 10,884,952 | B2* | 1/2021 | Lemay | G06F 12/1466 |
| 10,887,346 | B2* | 1/2021 | Araujo | H04L 63/1491 |
| 2008/0271001 | A1* | 10/2008 | Nonomura | G06F 21/125 |
| | | | | 717/143 |
| 2011/0145926 | A1* | 6/2011 | Dalcher | G06F 21/53 |
| | | | | 726/26 |
| 2013/0139264 | A1* | 5/2013 | Brinkley | G06F 21/554 |
| | | | | 726/24 |
| 2013/0160133 | A1* | 6/2013 | Avgerinos | G06F 21/57 |
| | | | | 726/26 |
| 2013/0205403 | A1* | 8/2013 | Grocutt | G06F 21/52 |
| | | | | 726/27 |
| 2014/0344924 | A1* | 11/2014 | McLachlan | G06F 21/629 |
| | | | | 726/22 |
| 2015/0347771 | A1* | 12/2015 | Malhotra | G06F 21/566 |
| | | | | 726/29 |
| 2017/0286278 | A1* | 10/2017 | Thomas | G06F 8/70 |
| 2018/0181498 | A1* | 6/2018 | Makowski | G06F 21/51 |
| 2020/0293682 | A1* | 9/2020 | Zonouz | G06F 21/552 |

OTHER PUBLICATIONS

Brahmakshatriya et al.; "An Instrumenting Compiler for Enforcing Confidentiality in Low-Level Code"; 2017; retrieved from the Internet https://pure.mpg.de/pubman/faces/ViewItemOverviewPage.jsp?itemId=item_2552648; pp. 1-14, as printed. (Year: 2017).*

Petkovic et al.; "A Host based method for data leak protection by tracking sensitive data flow"; 2012; retrieved from the Internet https://ieeexplore.ieee.org/abstract/document/6195195; pp. 1-8, as printed. (Year: 2012).*

Chen et al.; "Shreds: Fine-grained Execution Units with Private Memory"; 2016; retrieved from the Internet https://ieeexplore.ieee.org/abstract/document/7546495; pp. 1-16, as printed. (Year: 2016).*

Hong et al., "DynaPoMP: Dynamic Policy-Driven Memory Protection for SPM-based Embedded Systems"; 2010; retrieved from the Internet https://dl.acm.org/doi/abs/10.1145/2072274.2072279; pp. 1-10, as printed. (Year: 2010).*

Doudalis et al.; "Effective and Efficient Memory Protection Using Dynamic Tainting"; 2012; Retrieved from the Internet https://ieeexplore.ieee.org/abstract/document/5611490; pp. 1-14, as printed. (Year: 2012).*

Liu, et al., "PtrSplit: Supporting General Pointers in Automatic Program Partitioning," Proceedings, 2017, pp. 2359-2371, ACM SIGSAC Conference on Computer and Communications Security, New York, NY.

Brumley, et al., "Privtrans: Automatically Partitioning Programs for Privilege Separation," proceedings, 2004, 17 pages, USENIX Security.

Saur, et al., "C-Strider: Type-Aware Heap Traversal for C," Journal, 2014, 23 pages, DOI: 10.1002/spe, Software Practice and Experience, Wiley Online Library, Medford, MA.

Guan, et al., "Protecting Private Keys Against Memory Disclosure Attacks Using Hardware Transactional Memory," Symposium, 2015, 17 pages, IEEE, San Jose, CA.

Bittau, et al., "Wedge: Splitting Applications into Reduced-Privilege Compartments," Symposium on Networked Systems Design and Implementation, 2008, pp. 309-322, USENIX Association, Berkeley, CA.

Chen, et al., "Shreds: Fine-Grained Execution Units With Private Memory," Symposium on Security and Privacy, May 23-25, 2016, 16 pages, DOI 10.1109/SP.2016.12, IEEE Computer Society, San Jose, CA.

Mambretti, et al., "Trellis: Privilege Separation for Multi-User Applications Made Easy," book, 2016, pp. 437-456, DOI: 10.1007/978-3-319-45719-2_20, RAID, Paris France.

Litton, et al., "Light-Weight Contexts: An OS Abstraction for Safety and Performance," paper included in proceedings of a Symposium, Nov. 2-4, 2016, pp. 49-64, ISBN 978-1-931971-33-1, USENIX, Savannah, GA.

Vasilakis, et al., "BreakApp: Automated, Flexible Application Compartmentalization," Symposium, Feb. 18-21, 2018, 15 pages, ISBN 1-1891562-49-5, Network and Distributed Systems Security, San Diego, CA.

Lamowski, et al., "Sandcrust: Automatic Sandboxing of Unsafe Components in Rust," paper, Oct. 28, 2017, 7 pages, ISBN 978-1-4503-5153—Sep. 17, 2010, Association for Computing Machinery, Shanghai, China.

Tsampas, et al., "Towards Automatic Compartmentalization of C Programs on Capability Machines," Workshop on Foundations of Computer Security, 2017, 14 pages.

Kuznetsov, et al., "Code-Pointer Integrity," proceedings, Oct. 2014, 17 pages, USENIX Symposium on Operating Systems Design and Implementation, Broomfield, CO.

* cited by examiner

SYSTEM, METHOD AND APPARATUS FOR AUTOMATIC PROGRAM COMPARTMENTALIZATION

FIELD

The present disclosure generally relates to the field of computing. More particularly, an embodiment of the invention generally relates to systems, methods and devices to provide automatic program compartmentalization to protect against hacking and to provide security through automated compartmentalization.

BACKGROUND

The principle of least privilege (or principle of minimal privilege or least authority) requires that in a particular abstraction layer of a computing environment, every module (such as process, user or program) must be able to access only the information and resources that are necessary for its legitimate purpose. This means giving a user only privileges essential to perform its intended function. Unessential privileges are blocked to enhance security. As applied to users, the terms least user access or least-privileged user account (LUA) are also used. Such terms refer to the concept that all user accounts at all times should run with as few privileges as possible and launch applications with as few privileges as possible.

The Heartbeat Extension for the Transport Layer Security (TLS) and Datagram Transport Layer Security (DTLS) protocols was proposed as a standard in February 2012. Heartbleed is a security bug in the OpenSSL cryptography library (a widely used implementation of the TLS protocol). Heartbeat provides a way to test and keep alive secure communication links without the need to renegotiate the connection each time. After its dissemination, a security bug was discovered and exploited. The security bug was named Heartbleed. Heartbleed is just one example that illustrates how running all code in a single protection domain leaves critical data exposed to being leaked due to a flaw in any part of the program. Here, the vulnerable Heartbleed routine in the OpenSSL library had no need to access the private key and should have been prevented from doing so. Thus, there is a need to for a system, method and apparatus to address such vulnerabilities.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
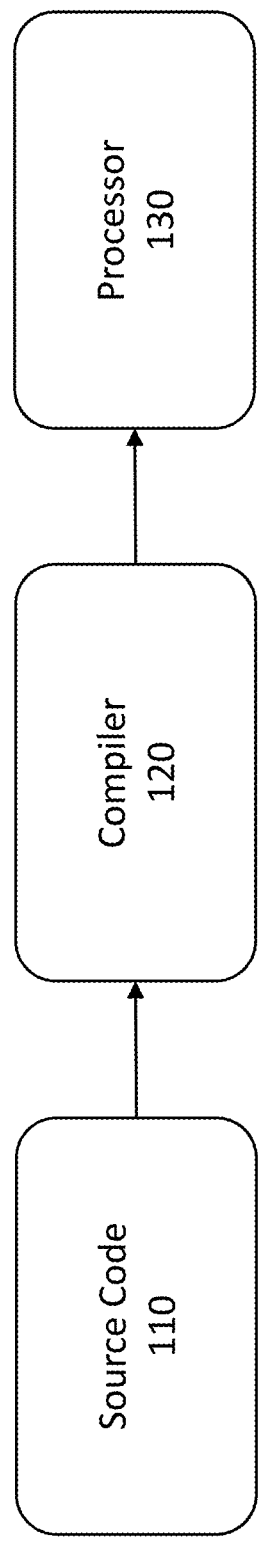
FIG. 1 schematically illustrates a conventional compiler.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software (including for example micro-code that controls the operations of a processor), or some combination thereof.

Data placement for loss prevention in a storage system can minimize data loss due to malicious attacks. Data may be stored at logical or physical storage compartments. An exemplary method of loss prevention is compartmentalization which constructs multiple logical compartment abstracts. Each logical compartment includes a placement policy including rules for placing storage symbols and a policy for balancing storage symbols among the physical storage containers.

Compartmentalization is a powerful, holistic, technique to mitigate many types of known and yet-to-be-discovered vulnerabilities by enforcing the principle of least privilege, so that even if a particular type of vulnerability affects some of the compartments, other compartments that are not affected will continue to protect the data that they contain.

In certain embodiments, this challenge is addressed by determining what portions of a program actually need access to sensitive (protected) data, and instrumenting the program to copy non-sensitive data through the boundary (i.e., logical boundary) between those portions of the program. By separating the program into multiple logical compartments, the damage from an exploit will be limited to just the targeted compartment. In certain embodiments, a compiler may be enhanced to automatically compartmentalize one or more programs. In another embodiment, a compiler may be configured to autonomously (e.g., automatically) compartmentalize a program. Automated tooling for adapting programs to enforce the principle of least privilege can maximize the security benefits of such compartmentation features and hence increase uptake of those features.

Conventional memory safety techniques, including Intel's Memory Protection Extension (MPX), block many types of exploits. The MPX technology introduces bounds registers and new instruction set extensions that operate on these registers. MPX also includes a set of bound tables that store bounds beyond what can fit in the bounds registers. However, MPX imposes substantial overhead and thereby detracts from user experience. Some other memory safety techniques have lower overheads, but they all still impose some overhead in terms of performance or memory usage. Further, such solutions only offer probabilistic protection.

Another example is DataShield from the Purdue University. DataShield limits the overhead from memory safety checks (i.e., bounds checks) by separating data into sensitive and non-sensitive sets. Sensitive data and their bounds information are stored in sensitive memory while non-sensitive data are stored in non-sensitive memory. Any pointer to sensitive data is checked against its bounds before accessing memory. Any pointer to non-sensitive data is blocked from accessing sensitive memory with a coarse-grained bounds check. Because DataShield statically determines whether program elements are sensitive, it tends to over-estimate sensitivity. This results in excessive overhead and a lack of scalability.

Another example is the Software Guard Extension (SGX) which defines a compartment within an application to host the most sensitive logic for that application. This may help developers make effective use of SGX by automatically defining the boundary of the enclave. The CHERI project from the University of Cambridge and capabilities in general provide hardware mechanisms to enforce compartmentation. CHERI may also help developers make effective use of such technologies.

FIG. 1 schematically illustrates a conventional compiler. In FIG. 1, program code in the form of source code 110 is provided to compiler 120. Compiler 120 converts or translates program source code 110 to machine (interchangeably, object) code and provides the object code to processor 130. The compiler may be a conventional compiler whereby the entire source code is translated or it may be an interpreter where the source code 110 is translated one line at a time.

In one embodiment, the disclosure provides an enhanced compiler (e.g., to automatically define multiple compartments within a program based on the data sets that they access. For example, the automated compiler may be a compartmentalizing compiler. For each data set, the compartmentalizing compiler separates program elements that need direct access to the data set from those that do not. The compartmentalizing compiler also defines a boundary around the data set and the program elements that need to access it. Other portions of the program may still need to invoke the compartment. Thus, in certain embodiments, an interface routine is generated to copy data back and forth through the compartment boundary.

The disclosed embodiments are advantageous in several aspects. For example, program compartmentalization enhances security by mitigating known and yet-to-be-discovered types of vulnerabilities. It also amplifies the value of investments in hardware compartmentalization and/or Trusted Execution Environment (TEE) support by assisting developers to make use of those features with less effort required to refactor code.

Figure 2:
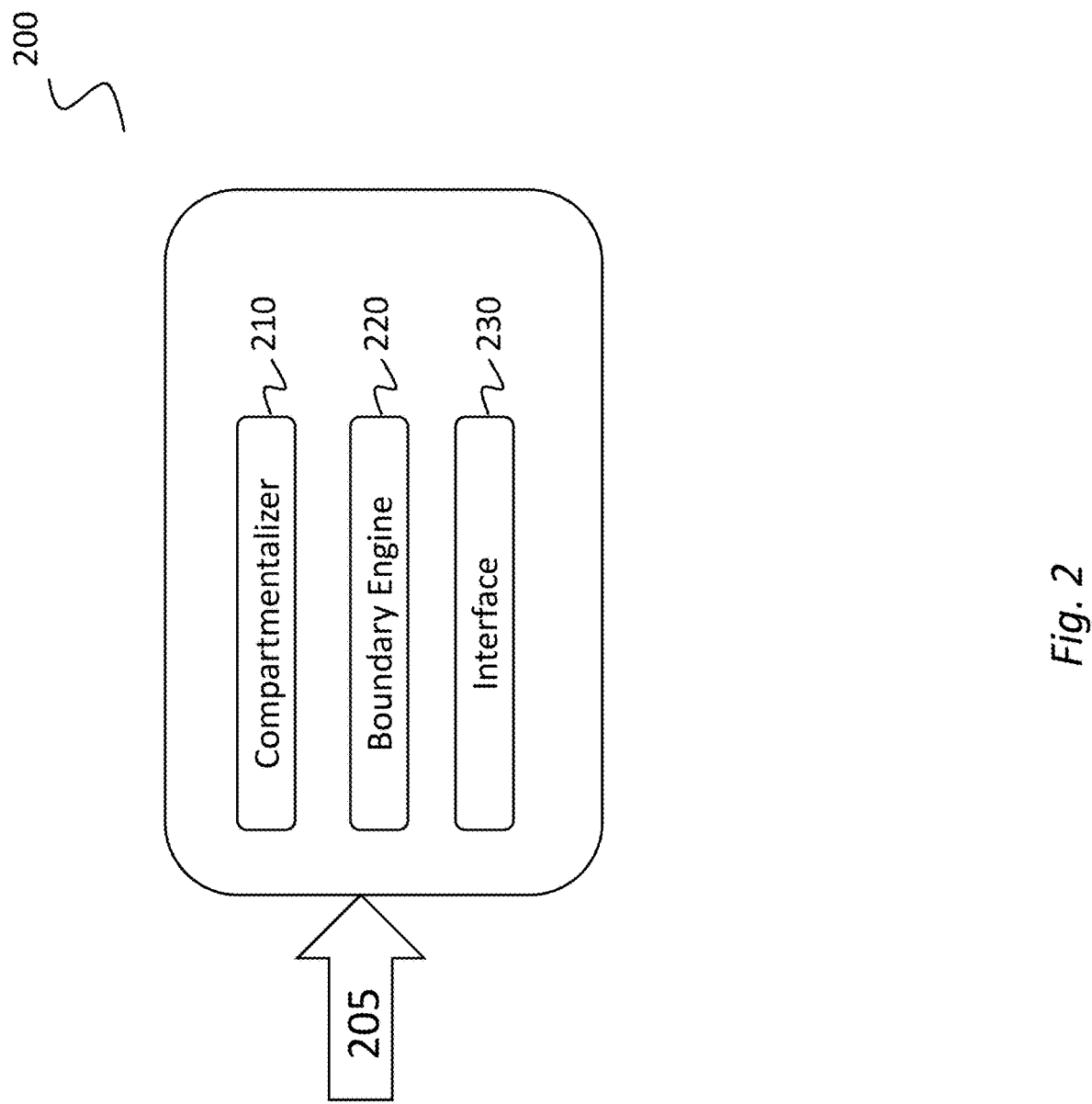
FIG. 2 is a high level schematic representing an embodiment of the disclosure.

FIG. 2 is a high level schematic representing an embodiment of the disclosure. For simplicity, compartmentalizing compiler 200 of FIG. 2 is shown only with compartmentalizer engine 210, boundary engine 220 and interface 230. The compartmentalizing compiler 200 may be implemented in hardware, software (e.g., algorithm) or a combination of hardware and software. The input to compartmentalizing compiler 200 may be source code. In one embodiment, the source code may be translated after compartmentalizing.

Compartmentalizer engine 210 receives a program data set 205 which may include program elements and data sets. Optionally, the program data set may comprise program elements only and refer tangentially to the relevant data sets.

In one embodiment, compartmentalizer engine 210 defines two or more compartments within the program based on the data sets they need to access. For example, the compartmentalizer engine 210 may define a first compartment having highest level of security for code that need to access highly secure data set. The compartmentalizer engine 210 may define a second compartment having an intermediate level of security for code that need to access moderately secure data set. The compartmentalizer engine 210 may define a third compartment having no security for code that need to access unsecure or readily available data sets.

Boundary engine 220 may define boundaries around data sets to comport with the security level described above. Similarly, boundary engine 220 may also define boundaries around program elements that need access to data sets of different security level. Lastly, boundary engine 220 may identify other portions of the program that may not need any security control. Boundary engine 220 may be implemented as a separate module or it may be integrated with the compartmentalizer engine 210.

Interface 230 may comprise one or more routines to copy data between or through compartment boundaries defined by boundary engine 230. Data may be copied from one boundary to another in order to maintain the integrity of the original data. In this manner, if copied program elements are compromised, the original program elements remain intact.

To exemplify certain applications of the compartmentalizing compiler 200, the following example of a use case for protecting a type of sensitive data (or specific variables regardless of type) that is processed by a portion of a program. By way of example, similar policies are currently enforced by the DataShield SDK from Purdue University which is used herein for illustration. It should be noted that the disclosed embodiments extend well beyond DataShield in many ways and DataShield is used by way of example. This can be generalized to one type of sensitive data processed by multiple distinct portions of the program (e.g., two separate libraries that both perform RSA encryption key operations, but for different purposes) and to multiple types of sensitive data processed by multiple portions of the program.

In one embodiment, the disclosure avoids the need for explicitly deciding (or being defined by the programmer) as to which types of data are sensitive as it seeks to automatically find some partitioning of a program that strikes an optimal balance between the frequency of compartment boundary crossings and the precision with which the principle of least privilege is enforced.

The details of the underlying compartmentalization enforcement (generically, Trusted Execution Environment (TEE)) influence how the compartmentalizing compiler needs to operate. There is a great deal of variation amongst conventional TEEs. For example, some conventional TEEs have specific instructions to transition in and out of the TEE, whereas others can intersperse instructions from multiple environments (e.g., from inside and outside of the TEE). The amount of overhead from transition instructions also varies greatly and can cause latency. These factors influence how fine-grained compartments can be while still imposing a reasonable performance burden.

Some conventional TEEs prohibit all memory accesses from crossing TEE boundaries, whereas others allow certain accesses to cross that boundary. This affects the forms of automatic compartmentalization that can be implemented. For example, SGX™ prevents normal application code from accessing enclave data, but enclaves are permitted to access normal application data. As another example, CHERI supports both a default data capability granting access to most of a compartment's data, but it also allows instructions within a compartment to specify non-default data capabilities to access certain memory regions outside of the compartment. Selectively allowing accesses outside of the compartment can lower data transfer overhead due to the opportunity to minimize data copies. DataShield™ by default does not allow data accesses across compartment boundaries.

Conventional TEEs can also apply different levels of vulnerability mitigation depending on the sensitivity of the data with which they are entrusted. For example, DataShield™ applies strict memory safety mechanisms on code authorized to access sensitive data to mitigate vulnerabilities such as buffer overflows.

The way in which vulnerability mitigation is implemented means that the program code looks up metadata associated with each data element to be accessed. Metadata is only maintained for data in the sensitive compartment, due to the overhead involved. Thus, code in the sensitive compartment is unable to access data outside of the sensitive compartment, even though doing so would not result in a security violation.

There are several ways to address this shortcoming. One possibility is to mark all data that may be accessed by any instruction in the sensitive compartment as sensitive. This transitively requires marking any instruction that needs to access that data as sensitive and so on. This results in a great deal of extra overhead due to managing and checking metadata for sensitive data. This is the current approach used by DataShield™. An alternative is to limit the propagation of sensitivity markings to just the forward direction. In other words, if static analysis determines that any operand to an instruction may be sensitive, then the output of that instruction is marked as sensitive, but the converse is not assumed.

A related challenge occurs when the argument passed to some operand may be either sensitive or non-sensitive, depending on the particular context in which the instruction is executed. The problem of that instruction assuming that such operands always have bounds metadata can be solved by returning bounds covering the entire non-sensitive region when looking up bounds for any non-sensitive object. In one embodiment, those bounds may then be stored into the bounds metadata table for pointers that are marked as sensitive. Using such bounds prevents an access to a non-sensitive object from corrupting any sensitive object. This would limit the spread of sensitivity while still allowing instructions that need to access some sensitive data to also access non-sensitive data.

In one application, multiple parts of each program may be defined to facilitate efficient compartmentalization. The core part of a program can be compiled in normal mode where data are separated into different sets or subsets. One set may be sensitive data. The rest of the program can be compiled in sandboxed mode where all data are treated as non-sensitive data (i.e., the sandboxed code is prevented from gaining access to any data within the sensitive compartment). In the case of DataShield, the sandboxed code is instrumented with bounds checks that prevent the code from accessing any sensitive data. When these two parts interact with each other, the compiler either generates code to deep copy the data between the two memory regions or it propagates sensitivity so that some sandboxed code is effectively pulled into the compartment authorized to access sensitive data with attendant memory safety checks.

To support separate compilation units, the compartmentalizing compiler permits developers to annotate certain functions in one compartment (defined in this case as corresponding to a compilation unit) as being invokable from other compartments. This is handled analogously to the boundary between sandboxed and normal-mode code described above, except that the compiler is unable to pull code from a separate compilation unit into the sensitive compartment.

The compiler also assumes that the annotations indicate an authorized declassification point. These annotations will cause the compiler to generate a wrapper function with the expected name (i.e., the original name of the function). The wrapper will then internally invoke a clone of the function with the proper sensitivity markings, and it will generate the appropriate deep copies as part of that. If the function accepts or returns a value lacking sufficient type information to automatically generate deep copy code (e.g. a value with type void * in C), then the developer is responsible for manually generating such a copy routine. Alternatively, some programming languages dynamically propagate information about the type of each object, and such information could be used to perform a correct deep copy. Such dynamic information could also be added to languages that do not propagate it by default. Propagating dynamic type information could be particularly important for determining the actual sizes of array objects, since arrays of different sizes may have identical static types in some languages.

Copying data out of a compartment constitutes declassification of that data, and the security of the system depends on declassification being performed in a trustworthy manner. This can be assured to varying degrees, for example, by performing static or dynamic taint tracking within the compartment to verify that sensitive data does not leak through the compartment boundary, by relying on the annotations described above as being indications of trustworthiness, or by defining authorized declassification boundaries implicitly. For example, source file or function boundaries could be used to specify declassification boundaries.

Copying data between compartments may result in multiple simultaneous copies of the same object with overlapping lifetimes. The correctness of the program may depend on updates to any copy being propagated to some or all of the other copies. For example, this may be accomplished by maintaining a record of copied objects and performing updates to all copies simultaneously. This may involve the use of a lock to prevent race conditions during concurrent accesses to the objects from multiple compartments, since the source program may have been written assuming that only one copy of each object would exist.

Maintaining multiple copies of objects also requires determining appropriate lifetimes for each copy. Garbage collected languages already include facilities for determining when an object is no longer referenced, which may directly address this requirement. Languages with manual memory management (e.g. malloc and free in C to manage heap allocations) may free all copies of an object when any one of them is freed. However, this may still result in excessive memory usage if an object copy is actually only used for a short period of time and is freed much later. Such waste may be eliminated if the compiler can determine that a copy is no longer referenced at some point in the program and automatically insert code to free just the copied object at or after that point.

The same object may be passed across the same compartment boundary multiple times, in which it may be advantageous to detect whether a copy of the object already exists in the destination compartment. If so, that copy may be reused rather than generating a new copy. A table may be maintained to record such information.

One of the challenges when attempting to avoid excessive expansion of a compartment is to determine which operations in a program actually transmit sensitive data versus which do not, even though they may be connected to a sensitive program element.

In an embodiment, a conservative policy may be adopted to propagate sensitivity markings along all connections between program elements. In one embodiment, the disclosure provides a different approach to more precisely reflect the actual flow of sensitive data without needing to support the processing of pointers to non-sensitive data by instructions authorized to access sensitive data, as described above.

In an exemplary implementation of the disclosed embodiments, data may be categorized to normal mode and sandboxed mode. Within the normal mode, data may be separated into two categories: sensitive and non-sensitive data. Sensitive data may include data of sensitive type, elements of data of sensitive type, and copies of the previous two kinds of data. For example, RSA* rsa, rsa→d, and d (copied from rsa→d) can be considered as sensitive data. The sensitive data can be stored in a designated region of memory and have bounds metadata associated with it. The non-sensitive data, as a corollary, can be stored in a separate memory region and does not have bounds metadata associated with it. In the sandboxed mode, only non-sensitive data may be accessed.

In one embodiment, only the non-sensitive data in the sandboxed mode can be accessed.

A compartmentalizing compiler, according to some disclosed embodiments, may implement pass operation for propagating sensitivity. A key purpose of sensitivity analysis is to track data flow and make sure sensitive data are never stored in non-sensitive memory unless it is determined safe to do so based on static or dynamic taint tracking, or annotations. Sensitivity propagation starts with either sensitive type annotation or sensitive data annotation. Data of annotated sensitive type or annotated sensitive data are put into the sensitive set. Then, the sensitivity is propagated to other data based on instruction type. There are two general instruction types: sensitive to sensitive and sensitive to non-sensitive. Each category is described below.

Sensitive to Sensitive—Such Instructions May Include:
(a) Call instructions that do not cross boundaries between compartments. For example, if the function is marked as sensitive due to its return values being sensitive, then the value in the caller that receives the return value from the function is also marked as sensitive. Conversely, if the value in the caller is marked as sensitive, then the return values in the callee are also marked as sensitive. Similar propagation is performed for function parameters and the corresponding function arguments.
(b) Load and Store instructions.
(c) Select instructions—Each select instruction contains a condition, a true value, and a false value. Sensitivity is only assumed to propagate from the condition if the compartmentalizing compiler is configured to track implicit data flows. However, sensitivity propagates from the true and false value branches of the select instruction to its output value and also in the reverse directions if backwards propagation is enabled.
(d) Cast instructions.
(e) GetElementPtr instructions, which represent pointer dereferences and structure field accesses.
(f) InsertElement and ExtractElement instructions. InsertElement instruction inserts a scalar element to a vector while ExtractElement instruction extracts a scalar element from a vector.
(g) InsertValue and ExtractValue instructions. InsertValue instruction inserts a struct field or array element value into an aggregate value while ExtractValue instruction extracts a struct member or array element value from an aggregate value.
(h) AtomicCmpXchg instructions—This instruction atomically checks if a specified value is in a memory location, and, if it is, stores a new value there.
(i) AtomicRMWInst instructions—This instruction atomically reads a memory location, combines it with another value, and the stores the result back.
(j) PhiNode virtual instructions which represent value transfers through control flow merge points at which multiple source basic blocks target a single destination basic block.
(k) Return instructions.

Sensitive to Non-Sensitive or Sensitive—

Binary operations—The compiler may be configured to reduce the sensitivity of data as it is transformed by binary operators such as add or sub instructions. Otherwise, these operators would effectively be added to the preceding list, in that they propagate sensitivity directly.

Select instructions—Each select instruction contains a condition and a value for each of the true and false conditions. It is configurable whether the sensitivity of the condition should propagate to the other two operands and the result and vice versa, depending on whether tracking implicit data flows is desired.

Sensitive to non-sensitive—All other instructions not included in the above lists.

Figure 3:
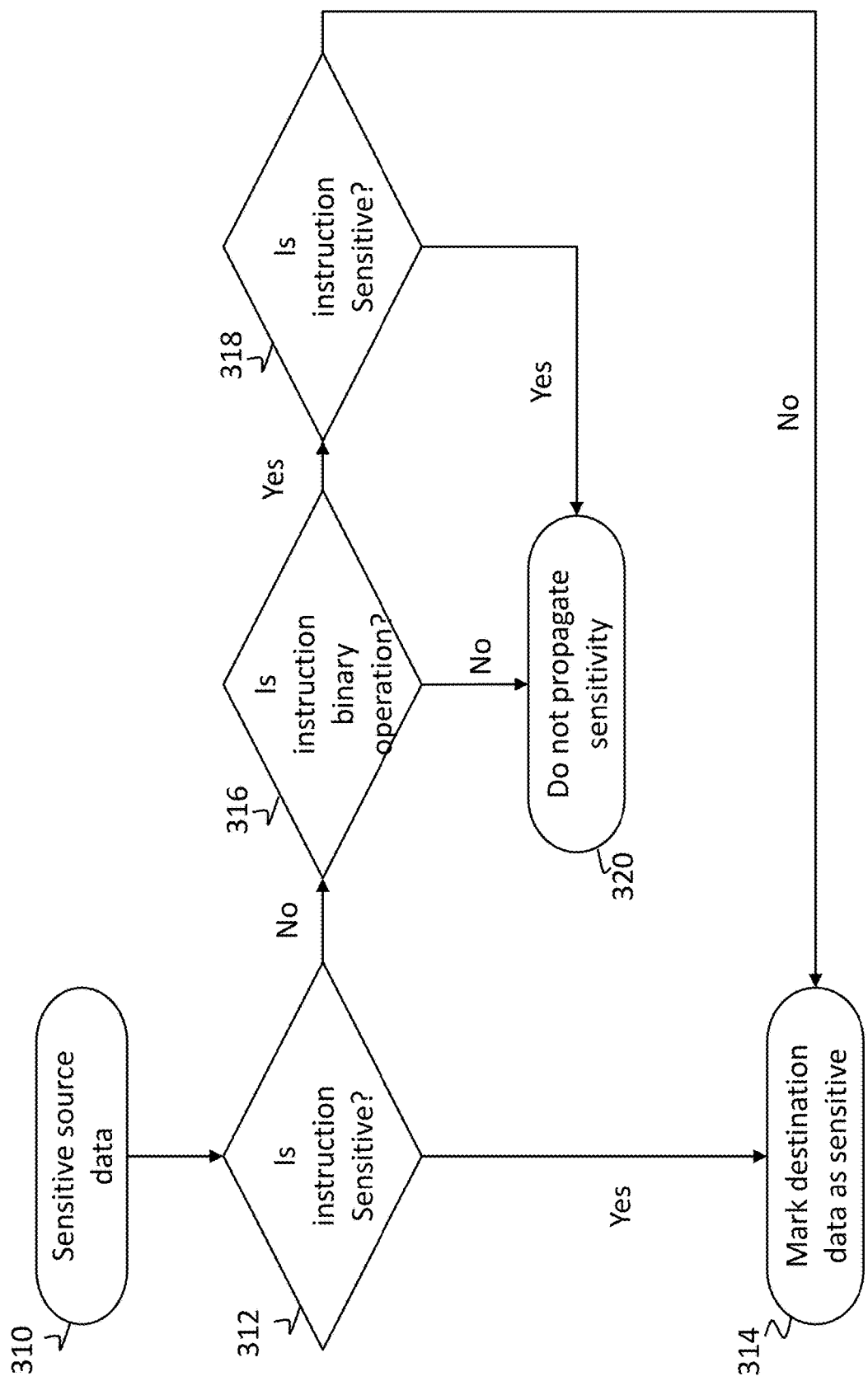
FIG. 3 is a flow-diagram illustrating an implementation of an exemplary embodiment of the disclosure.

FIG. 3 is a flow diagram illustrating an implementation of an exemplary embodiment of the disclosure. The flow diagram of FIG. 3 starts at step 310 where a compartmentalizing compiler identifies sensitive source data. At step 312, the program instructions are reviewed for sensitivity. In one application, a sensitive instruction is identified as one comprising: (a) Call instructions that do not cross boundaries between compartments. (b) Load and Store instructions. (c) Select instructions—Each select instruction contains a condition, a true value, and a false value. Sensitivity is only assumed to propagate from the condition if the compartmentalizing compiler is configured to track implicit data flows. However, sensitivity propagates from the true and false value branches of the select instruction. (d) Cast instructions. (e) GetElementPtr instructions, which represent pointer dereferences and structure field accesses. (f) InsertElement and ExtractElement instructions. InsertElement instruction inserts a scalar element to a vector while ExtractElement instruction extracts a scalar element from a vector. (g) InsertValue and ExtractValue instructions. InsertValue instruction inserts a struct field of array element value into an aggregate value while ExtractValue instruction extracts a struct member or array element value from an aggregate value. (h) AtomicCmpXchg instructions—This instruction atomically checks if a specified value is in a memory location, and, if it is, stores a new value there. (i) AtomicRMWInst instructions—This instruction atomically reads a memory location, combines it with another value, and the stores the result back. (j) PhiNode virtual instructions which represent control flow merge points at which multiple source basic blocks target a single destination basic block. (k) Return instructions.

If the result of step 312 determination is that the instruction is sensitive, then the flow diagram proceeds to step 314, where the destination data is marked as sensitive. If the determination of step 312 is that the instruction is not sensitive, then the flow diagram proceeds to step 316, in which determination is made as to whether the instruction is a binary operation. If the instructions are not a binary operation, then the flow diagram ends at step 320 in which the sensitivity is not propagated. If the instructions define a binary operation, then the flow diagram proceeds to inquiry 318 where it is determined whether the compiler is configured to declassify the destination data. If the destination data is to be declassified, then the process ends at step 320 wherein sensitivity is not propagated. If, on the other hand, the destination data is not to be declassified, at step 318, the process ends at step 314, wherein the destination data is marked as sensitive. The decision block 319 is to select instructions analogous to the one for binary operations. While the exemplary embodiment of FIG. 3 only depicts forward sensitivity propagation, it should be noted that the disclosed principles are not limited thereto and may be equally applied to backward propagation.

In one embodiment, call instructions crossing boundaries between compartments (e.g., compilation units) are treated as possible points of declassification, either for arguments being passed into functions or for values being returned from functions. When sensitive data needs to be passed into a function parameter marked as non-sensitive or when sensitive data needs to be returned from a function into a non-sensitive storage location, the compiler automatically inserts a deep copy to perform that declassification by copying the value from the sensitive memory region to the non-sensitive memory region. However, if the sensitive data are of the type that cannot be copied (i.e. the compiler does not know how to copy it), a couple of distinct actions are possible. The boundary between the compartments could be adjusted to avoid having the challenging call instruction on the boundary, or the developer could be required to write a deep copy function manually.

Figure 4:
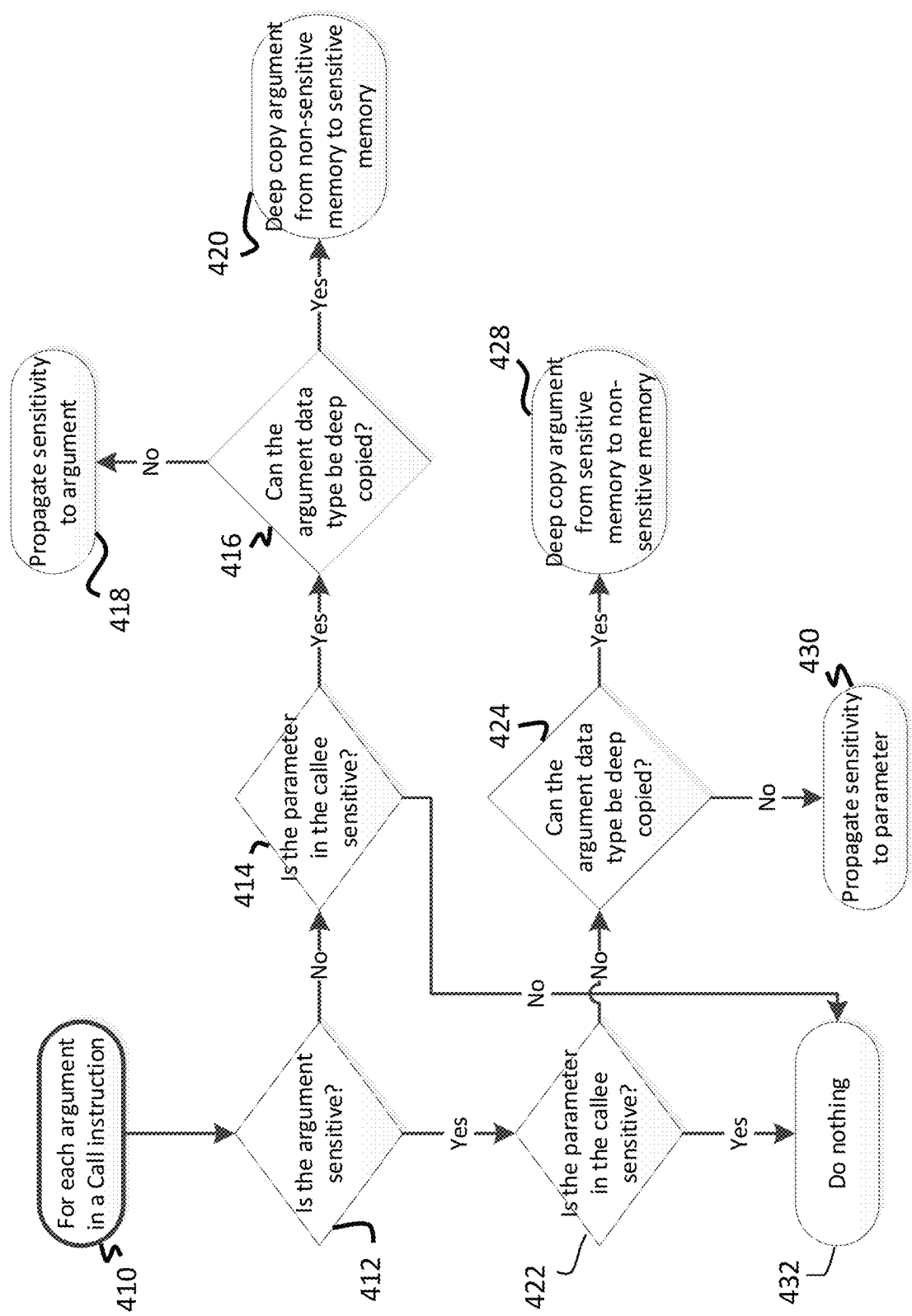
FIG. 4 is a flow diagram illustrating sensitivity propagation or deep copy according to one embodiment of the disclosure.

FIG. 4 is a flow diagram illustrating sensitivity propagation or deep copy for arguments in a call instruction according to one embodiment of the disclosure. The process of flow diagram of FIG. 4 may be implemented for each argument in a call instruction as noted in step 410.

At step 412, a determination is made as to whether the argument is sensitive. If the argument is deemed sensitive, then the process proceeds to step 422, where a determination is made as to whether the parameter in the callee is sensitive. If the parameter is deemed sensitive in step 422, nothing further is done regarding the call argument 410.

If the determination at step 422 is negative, then the process flows to step 424 when determination is made as to whether the argument data can be deep copied. If the argument can be deep copied (i.e. the compiler knows how to copy it based on its type information), then at step 428, the argument is deep copied from sensitive memory to non-sensitive memory. IF the argument data type cannot be deep copied (step 424), then the compartmentalizer propagates sensitivity to parameter data at step 430.

If the argument 410 is not found to be sensitive at step 412, then at step 414, determination is made as to whether the parameter in the callee is sensitive. If the determination of step 414 is negative, then the process flows to step 432 where nothing further is done.

If the determination of step 414 is positive, then inquiry is made at step 416 as to whether the argument data type can be deep copied at step 416. If the argument data can not be deep copied, then the process ends at step 418, where sensitivity is propagated to the call argument 410. If the argument data can be deep copied, then the process moves to step 420 the argument is copied from non-sensitive memory to sensitive memory.

To avoid excessive deep copies and expansion of the sensitive compartment, certain embodiments allow certain pointers from the non-sensitive memory to point into the sensitive memory region. When a function from the sensitive compartment is called from the non-sensitive compartment, and a sensitive pointer is returned to the non-sensitive compartment or passed as an argument from the non-sensitive compartment to the sensitive compartment, the compiler automatically generates a wrapper function in the sensitive compartment to insert bounds information in a newly-defined interface metadata table that maps sensitive pointer values (rather than storage locations of sensitive pointers as are used in the bounds metadata table described earlier) to the bounds and types of the pointed-to values. Sensitive functions that accept sensitive pointers will check that the incoming pointer is registered in the metadata table and that it has the expected type. Those functions will then update the sensitive metadata table with the bounds info from the interface metadata table. The assumption is that the sensitive content the pointer points to is only used by the functions in the sensitive compartment, which is true for applications such as NGINX compiled with OPENSSL library. Inside the callee, this pointer is treated as a sensitive pointer and checked against fine-grained bounds. Outside the callee in the non-sensitive compartment, this pointer is treated as a non-sensitive pointer. If the non-sensitive compartment erroneously or maliciously attempts to access memory through the pointer, the coarse-grained bounds checks that are applied to non-sensitive pointers will prevent the attempted access.

Certain embodiments of the disclosure differ from DataShield™ in that the disclosed principles:

(1) Allow implicit dataflows to be optionally ignored to prevent excessive spread of sensitivity markings.
(2) Optionally support declassification of data when it is transformed by operators that mix in non-sensitive information. Logically, this may be desired if only the raw sensitive data (e.g. an unprocessed key) requires the highest level of protection.
(3) Introduce deep copy to declassify sensitive data or to make non-sensitive data accessible to instructions in the sensitive compartment across approved boundaries, such as between compilation units.
(4) Allow certain pointers from the non-sensitive memory to point to the sensitive memory and store bounds information for them in an interface metadata table.
(5) Introduce forward-only sensitivity propagation to prevent excessive spread of sensitivity markings.
(6) Allow pointers from the sensitive memory to access the non-sensitive memory and store bounds information for them.

After the sensitivity analysis, the compiler inserts three types of instructions:

bounds generation instructions after sensitive memory allocations.

fine-grained bounds check instructions before sensitive memory accesses.

coarse-grained bounds check instructions before non-sensitive memory accesses.

The disclosed embodiments may be implemented in hardware, software or a combination of hardware and software. In certain implementations, the embodiments may be implemented on software run on one or more processors or processing circuits.

Figure 5:
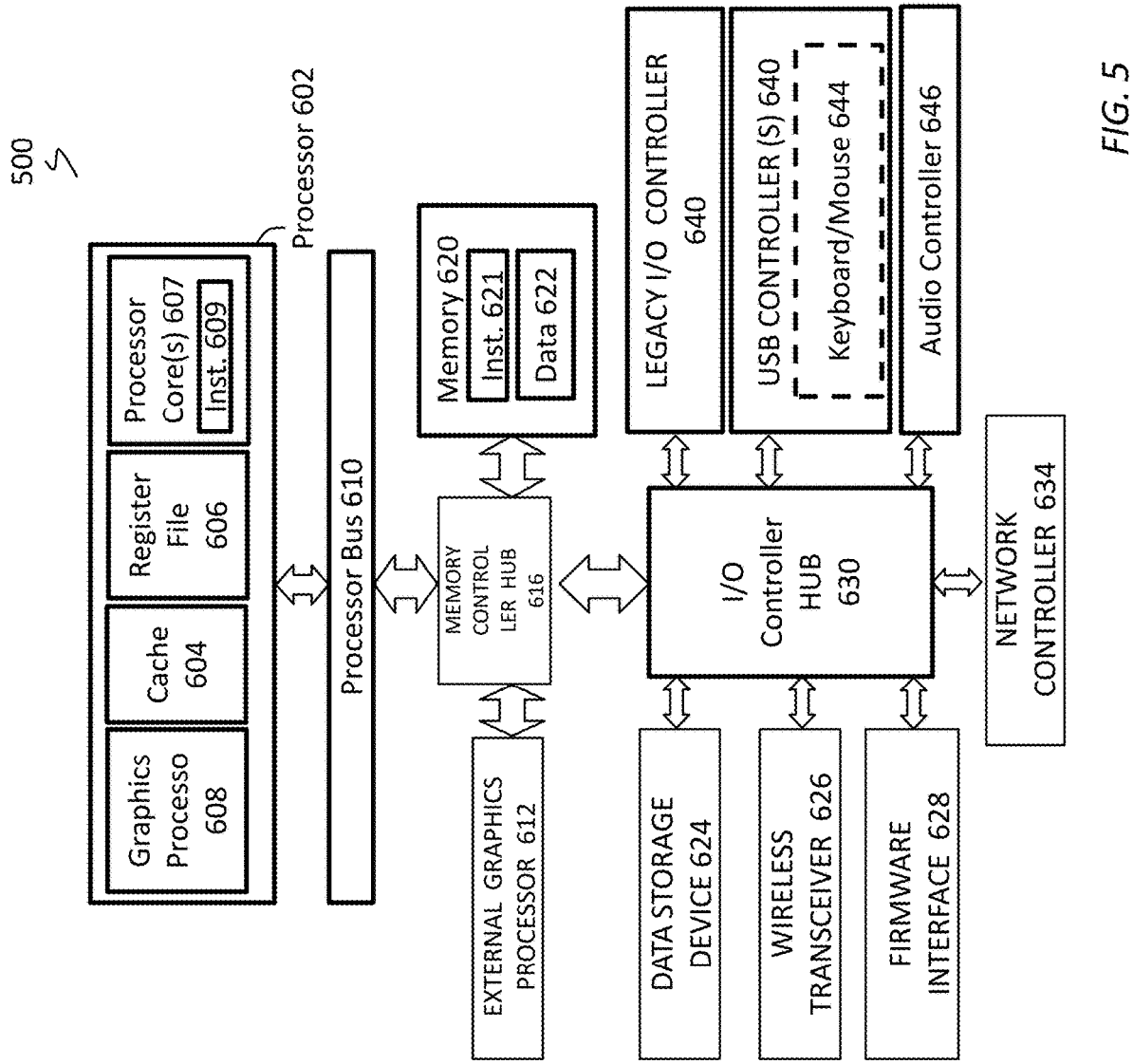
FIG. 5 is a block diagram of a processing system 600, according to an embodiment.

FIG. 5 is a block diagram of a processing system 500, according to an embodiment. FIG. 5 is a block diagram of a processing system 500, according to an embodiment. In various embodiments the system 500 includes one or more processors 502 and one or more graphics processors 508, and may be a single processor desktop system, a multiprocessor workstation system, or a server system having a large number of processors 502 or processor cores 507. In on embodiment, the system 500 is a processing platform incorporated within a system-on-a-chip (SoC or SOC) integrated circuit for use in mobile, handheld, or embedded devices.

An embodiment of system 500 can include, or be incorporated within a server-based gaming platform, a game console, including a game and media console, a mobile gaming console, a handheld game console, or an online game console. In some embodiments system 500 is a mobile phone, smart phone, tablet computing device or mobile Internet device. Data processing system 500 can also include, couple with, or be integrated within a wearable device, such as a smart watch wearable device, smart eyewear device, augmented reality device, or virtual reality device. In some embodiments, data processing system 500 is a television or set top box device having one or more processors 502 and a graphical interface generated by one or more graphics processors 508.

In some embodiments, the one or more processors 502 each include one or more processor cores 507 to process instructions which, when executed, perform operations for system and user software. In some embodiments, each of the one or more processor cores 507 is configured to process a specific instruction set 509. In some embodiments, instruction set 509 may facilitate Complex Instruction Set Computing (CISC), Reduced Instruction Set Computing (RISC), or computing via a Very Long Instruction Word (VLIW). Multiple processor cores 507 may each process a different instruction set 509, which may include instructions to facilitate the emulation of other instruction sets. Processor core 507 may also include other processing devices, such a Digital Signal Processor (DSP).

In some embodiments, the processor 502 includes cache memory 504. Depending on the architecture, the processor 502 can have a single internal cache or multiple levels of internal cache. In some embodiments, the cache memory is shared among various components of the processor 502. In some embodiments, the processor 502 also uses an external cache (e.g., a Level-3 (L3) cache or Last Level Cache (LLC)) (not shown), which may be shared among processor cores 807 using known cache coherency techniques. A register file 506 is additionally included in processor 502 which may include different types of registers for storing different types of data (e.g., integer registers, floating point registers, status registers, and an instruction pointer register). Some registers may be general-purpose registers, while other registers may be specific to the design of the processor 502.

In some embodiments, processor 502 is coupled to a processor bus 510 to transmit communication signals such as address, data, or control signals between processor 502 and other components in system 500. In one embodiment the system 500 uses an exemplary 'hub' system architecture, including a memory controller hub 516 and an Input Output (I/O) controller hub 530. A memory controller hub 516 facilitates communication between a memory device and other components of system 500, while an I/O Controller Hub (ICH) 530 provides connections to I/O devices via a local I/O bus. In one embodiment, the logic of the memory controller hub 516 is integrated within the processor.

Memory device 520 can be a dynamic random access memory (DRAM) device, a static random access memory (SRAM) device, flash memory device, phase-change memory device, or some other memory device having suitable performance to serve as process memory. In one embodiment the memory device 520 can operate as system memory for the system 500, to store data 522 and instructions 521 for use when the one or more processors 502 executes an application or process. Memory controller hub 516 also couples with an optional external graphics processor 512, which may communicate with the one or more graphics processors 508 in processors 502 to perform graphics and media operations.

In some embodiments, ICH 530 enables peripherals to connect to memory device 520 and processor 502 via a high-speed I/O bus. The I/O peripherals include, but are not limited to, an audio controller 546, a firmware interface 528, a wireless transceiver 526 (e.g., Wi-Fi, Bluetooth), a data storage device 524 (e.g., hard disk drive, flash memory, etc.), and a legacy I/O controller 540 for coupling legacy (e.g., Personal System 2 (PS/2)) devices to the system. One or more Universal Serial Bus (USB) controllers 542 connect input devices, such as keyboard and mouse 544 combinations. A network controller 534 may also couple to ICH 530. In some embodiments, a high-performance network controller (not shown) couples to processor bus 510. It will be appreciated that the system 500 shown is exemplary and not limiting, as other types of data processing systems that are differently configured may also be used. For example, the I/O controller hub 530 may be integrated within the one or more processor 502, or the memory controller hub 516 and I/O controller hub 530 may be integrated into a discreet external graphics processor, such as the external graphics processor 512.

Figure 6:
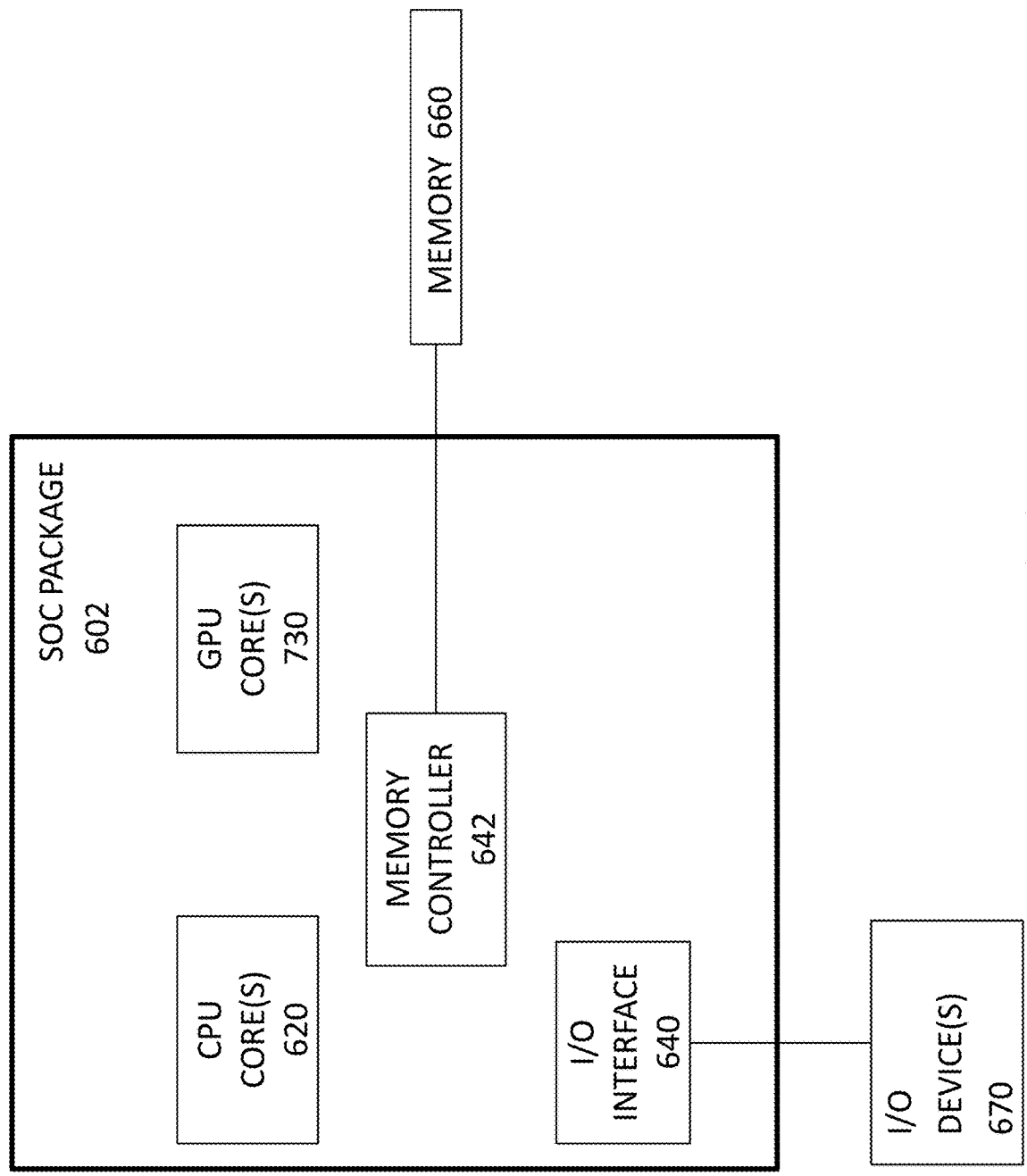
FIG. 6 illustrates a block diagram of an SOC package in accordance with an embodiment.

FIG. 6 illustrates a block diagram of an SOC package for implementing a compartmentalization engine in accordance with an embodiment of the disclosure. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

SOC package 602 is coupled to a memory 660 via the memory controller 642. In an embodiment, the memory 660 (or a portion of it) can be integrated on the SOC package 602. The I/O interface 640 may be coupled to one or more I/O devices 670, e.g., via an interconnect and/or bus such as discussed herein with reference to other figures. I/O device (s) 670 may include one or more of a keyboard, a mouse, a touchpad, a display, an image/video capture device (such as a camera or camcorder/video recorder), a touch screen, a speaker, or the like.

In various embodiments of the invention, the operations discussed herein, e.g., with reference to FIGS. 1-6, may be implemented as hardware (e.g., logic circuitry), software (including, for example, micro-code that controls the operations of a processor such as the processors discussed with reference to FIGS. 5-6), firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Additionally, such computer-readable media may be downloaded as a computer program product, wherein the program may be transferred from a remote computer (e.g., a server) to a requesting computer (e.g., a client) by way of data signals, e.g., through a carrier wave or other propagation medium, via a communication link (e.g., a bus, a modem, or a network connection).

The following example further illustrate embodiments of the disclosure. These examples are non-limiting. Example 1 is directed to a compartmentalizing compiler, comprising: a compartmentalizer module to receive one or more elements of the computer program, the compartmentalizer module configured to separate the one or more program elements to a first group that accesses sensitive data and a second group that does not access sensitive data; a boundary module to define one or more boundaries and thereby form a plurality of compartments; each compartment configured to receive and store at least one program element as a function of its access to sensitive data; a sensitivity propagation module to track data flow between compartments or across boundaries, the sensitivity propagation module configured to prevent storing sensitive data at a non-sensitive memory location; and an interface module to copy data across compartment boundaries.

Example 2 is directed to the compartmentalizing compiler of example 1, wherein each of the one or more elements of the computer program is defined to facilitate compartmentalization by the compartmentalizing compiler.

Example 3 is directed to the compartmentalizing compiler of example 2, wherein a core portion of the computer program is compiled in a normal mode and wherein data is separated into a plurality of sets as a function of data sensitivity.

Example 4 is directed to the compartmentalizing compiler of example 2, wherein a non-core portion of the computer program is compiled in a sandboxed mode and wherein the data compartmentalized in the sandboxed mode is prevented from accessing sensitive data compartmentalized in normal mode.

Example 5 is directed to the compartmentalizing compiler of example 1, wherein the sensitivity propagation module generates code to deep copy data from a sensitive memory region.

Example 6 is directed to the compartmentalizing compiler of example 4, wherein the sensitivity propagation module propagates sensitivity by removing sandboxed code into a compartment authorized to access sensitive data.

Example 7 is directed to the compartmentalizing compiler of example 5, wherein the sensitivity propagation module is configured to reduce sensitivity from sensitive data type to non-sensitive data type when sensitive data is transformed by binary operation.

Example 8 is directed to the compartmentalizing compiler of example 5, wherein the sensitivity propagation module is configured to propagate sensitivity when receiving one or more of call instructions that do not cross boundaries between compartments, load and store instructions, select instructions, cast instructions, GetElementPtr instructions, InsertElement and ExtractElement Instructions, InsertValue and ExtractValue Instructions, AtomicCmpXchg Instructions, AtomicRMWInst instructions, PhiNode virtual instructions and return instructions.

Example 9 is directed to a computer-readable medium comprising one or more instructions that when executed on a processor, configure the processor to perform one or more operations to: receive one or more elements of a computer program, the compartmentalizer module configured to separate the one or more program elements to a first group that accesses sensitive data and a second group that does not access sensitive data; define one more boundaries and thereby form a plurality of compartments to separate sensitive data from non-sensitive data, each compartment configured to receive and store at least one program element as a function of its access to sensitive data; track data flow between compartments or across boundaries and to prevent storing of sensitive data at a non-sensitive memory location; and copy data in between compartment boundaries.

Example 10 is directed to the computer-readable medium of example 9, wherein each of the one or more elements of the computer program is defined to facilitate compartmentalization.

Example 11 is directed to the computer-readable medium of example 9, wherein a core portion of the computer program is compiled in a normal mode and wherein data is separated into a plurality of sets as a function of data sensitivity.

Example 12 is directed to the computer-readable medium of example 9, wherein a non-core portion of the computer program is compiled in a sandboxed mode and wherein the data compartmentalized in the sandboxed mode is prevented from accessing sensitive data compartmentalized in normal mode.

Example 13 is directed to the computer-readable medium of example 9, wherein the instructions further configure the processor to generate code to deep copy data from a sensitive memory region.

Example 14 is directed to the computer-readable medium of example 12, wherein the instructions further configure the processor to propagates sensitivity by removing sandboxed code into a compartment authorized to access sensitive data.

Example 15 is directed to the computer-readable medium of example 14, wherein the instructions further configure the processor to reduce sensitivity from sensitive data type to non-sensitive data type when sensitive data is transformed by binary operation.

Example 16 is directed to the computer-readable medium of example 13, wherein the instructions further configure the processor to propagate sensitivity when receiving one or more of call instructions that do not cross boundaries between compartments, load and store instructions, select instructions, cast instructions, GetElementPtr instructions, InsertElement and ExtractElement Instructions, InsertValue and ExtractValue Instructions, AtomicCmpXchg Instructions, AtomicRMWInst instructions, PhiNode virtual instructions and return instructions.

Example 17 is directed to a program compartmentalization system, comprising: a processor to execute a plurality of instructions, the instructions configured to cause the processor to: receive one or more elements of a computer program, the compartmentalizer module configured to separate the one or more program elements to a first group that accesses sensitive data and a second group that does not access sensitive data; define one or more boundaries and thereby form a plurality of compartments to separate sensitive data from non-sensitive data, each compartment configured to receive and store at least one program element as a function of its access to sensitive data; track data flow between compartments or across boundaries and to prevent storing of sensitive data at a non-sensitive memory location; and copy data in between compartment boundaries; a memory configured to have a first memory location to store sensitive computer program elements and a second memory location to store non-sensitive program elements.

Example 18 is directed to the program compartmentalization system of example 17, wherein each of the one or more elements of the computer program is defined to facilitate compartmentalization.

Example 19 is directed to the program compartmentalization system of example 17, wherein a core portion of the computer program is compiled in a normal mode at the first and second memory locations and wherein data is separated into a plurality of sets as a function of data sensitivity.

Example 20 is directed to the program compartmentalization system of example 17, wherein a non-core portion of the computer program is compiled in a sandboxed mode at the second memory location and wherein the instructions compartmentalized in the sandboxed mode are prevented from accessing data stored at the first memory location.

Example 21 is directed to the program compartmentalization system of example 17, wherein the instructions further configure the processor to generate code to deep copy data from the first memory location.

Example 22 is directed to the program compartmentalization system of example 20, wherein the instructions further configure the processor to propagate sensitivity by removing sandboxed code into a compartment authorized to access sensitive data stored at the first memory location.

Example 23 is directed to the program compartmentalization system of example 21, wherein the instructions further configure the processor to reduce sensitivity from sensitive data type to non-sensitive data type when sensitive data is transformed by binary operation.

Example 24 is directed to the program compartmentalization system of example 21, wherein the instructions further configure the processor to propagate sensitivity when receiving one or more of call instructions that do not cross boundaries between compartments, load and store instructions, select instructions, cast instructions, GetElementPtr instructions, InsertElement and ExtractElement Instructions, InsertValue and ExtractValue Instructions, AtomicCmpXchg Instructions, AtomicRMWInst instructions, PhiNode virtual instructions and return instructions.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
a memory to store one or more instructions to compartmentalize one or more program elements of a computer program; and
a processor, coupled to the memory, to execute the one or more instructions to:
receive the one or more elements of the computer program and to separate the one or more program elements to a first group that accesses sensitive data and a second group that does not access sensitive data;
define one or more boundaries to thereby form a plurality of compartments, each compartment configured to receive and store at least one program element as a function of its access to sensitive data;
track data flow between the plurality of compartments or across boundaries and to prevent storing sensitive data at a non-sensitive memory location; and
to copy data across compartment boundaries;
wherein the processor is further configured to identify sensitive data as a function of one or more of sensitive type annotation or a sensitive data annotation associated with an accessed data; and to reduce sensitivity from a sensitive data type to a non-sensitive data type when sensitive data is transformed by binary operation.

2. The apparatus of claim 1, wherein each of the one or more elements of the computer program is defined to facilitate compartmentalization by processor.

3. The apparatus of claim 2, wherein a core portion of the computer program is compiled in a normal mode and wherein data is separated into a plurality of sets as a function of data sensitivity.

4. The apparatus of claim 2, wherein a non-core portion of the computer program is compiled in a sandboxed mode and wherein the data compartmentalized in the sandboxed mode is prevented from accessing sensitive data compartmentalized in normal mode.

5. The apparatus of claim 4, wherein the processor propagates sensitivity by removing sandboxed code into a compartment authorized to access sensitive data.

6. The apparatus of claim 1, wherein the sensitivity propagation module generates code to deep copy data from a sensitive memory region.

7. The apparatus of claim 6, wherein the sensitivity propagation module is configured to propagate sensitivity when receiving one or more of call instructions that do not cross boundaries between compartments, load and store instructions, select instructions, cast instructions, GetElementPtr instructions, InsertElement and ExtractElement Instructions, InsertValue and ExtractValue instructions, AtomicCmpXchg Instructions, AtomicRMWInst instructions, PhiNode virtual instructions and return instructions.

8. A non-transitory computer-readable medium comprising one or more a plurality of instructions that when executed on a processor, configure the processor to perform one or more operations to:
receive one or more elements of a computer program, the compartmentalizer module configured to separate the one or more program elements to a first group that accesses sensitive data and a second group that does not access sensitive data;
define one more boundaries and thereby form a plurality of compartments to separate sensitive data from non-sensitive data, each compartment configured to receive and store at least one program element as a function of its access to sensitive data;
track data flow between compartments or across boundaries and to prevent storing of sensitive data at a non-sensitive memory location; and
copy data in between compartment boundaries;
reduce sensitivity from sensitive data type to non-sensitive data type when sensitive data is transformed by binary operation;

wherein the compartmentalizing compiler is configured to identify sensitive data as a function of one or more of sensitive type annotation or a sensitive data annotation associated with an accessed data.

9. The computer-readable medium of claim 8, wherein each of the one or more elements of the computer program is defined to facilitate compartmentalization.

10. The computer-readable medium of claim 8, wherein a core portion of the computer program is compiled in a normal mode and wherein data is separated into a plurality of sets as a function of data sensitivity.

11. The computer-readable medium of claim 8, wherein a non-core portion of the computer program is compiled in a sandboxed mode and wherein the data compartmentalized in the sandboxed mode is prevented from accessing sensitive data compartmentalized in normal mode.

12. The computer-readable medium of claim 11, wherein the instructions further configure the processor to propagate sensitivity by removing sandboxed code into a compartment authorized to access sensitive data.

13. The computer-readable medium of claim 8, wherein the instructions further configure the processor to generate code to deep copy data from a sensitive memory region.

14. The computer-readable medium of claim 13, wherein the instructions further configure the processor to propagate sensitivity when receiving one or more of call instructions that do not cross boundaries between compartments, load and store instructions, select instructions, cast instructions, GetElementPtr instructions, InsertElement and ExtractElement Instructions, InsertValue and ExtractValue Instructions, AtomicCmpXchg Instructions, AtomicRMWInst instructions, PhiNode virtual instructions and return instructions.

15. The method of claim 13, further comprising propagating sensitivity when receiving one or more of call instructions that do not cross boundaries between compartments, load and store instructions, select instructions, cast instructions, GetElementPtr instructions, InsertElement and ExtractElement Instructions, InsertValue and ExtractValue Instructions, AtomicCmpXchg Instructions, AtomicRMWInst instructions, PhiNode virtual instructions and return instructions.

16. A program compartmentalization system, comprising:
a processor to execute a plurality of instructions, the instructions configured to cause the processor to:
receive one or more elements of a computer program, the compartmentalizer module configured to separate the one or more program elements to a first group that accesses sensitive data and a second group that does not access sensitive data;
define one or more boundaries and thereby form a plurality of compartments to separate sensitive data from non-sensitive data, each compartment configured to receive and store at least one program element as a function of its access to sensitive data;
track data flow between compartments or across boundaries and to prevent storing of sensitive data at a non-sensitive memory location;
copy data in between compartment boundaries; and
reduce sensitivity from sensitive data type to non-sensitive data type when sensitive data is transformed by binary operation;
a memory configured to have a first memory location to store sensitive computer program elements and a second memory location to store non-sensitive program elements;

wherein the compartmentalizing compiler is configured to identify sensitive data as a function of one or more of sensitive type annotation or a sensitive data annotation associated with an accessed data.

17. The program compartmentalization system of claim 16, wherein each of the one or more elements of the computer program is defined to facilitate compartmentalization.

18. The program compartmentalization system of claim 16, wherein a core portion of the computer program is compiled in a normal mode at the first and second memory locations and wherein data is separated into a plurality of sets as a function of data sensitivity.

19. The program compartmentalization system of claim 16, wherein a non-core portion of the computer program is compiled in a sandboxed mode at the second memory location and wherein the instructions compartmentalized in the sandboxed mode are prevented from accessing data stored at the first memory location.

20. The program compartmentalization system of claim 19, wherein the instructions further configure the processor to propagate sensitivity by removing sandboxed code into a compartment authorized to access sensitive data stored at the first memory location.

21. The program compartmentalization system of claim 16, wherein the instructions further configure the processor to generate code to deep copy data from the first memory location.

22. The program compartmentalization system of claim 21, wherein the instructions further configure the processor to propagate sensitivity when receiving one or more of call instructions that do not cross boundaries between compartments, load and store instructions, select instructions, cast instructions, GetElementPtr instructions, InsertElement and ExtractElement Instructions, InsertValue and ExtractValue Instructions, AtomicCmpXchg Instructions, AtomicRMWInst instructions, PhiNode virtual instructions and return instructions.

23. A method to compartmentalize a computer program, the method comprising:
receiving one or more elements of the computer program and separating the one or more program elements to a first group that accesses sensitive data and a second group that does not access sensitive data;
defining one more boundaries to thereby form a plurality of compartments for separating sensitive data from non-sensitive data, each of the plurality of compartments configured to receive and store at least one program element as a function of its access to sensitive data;
tracking data flow between the plurality of compartments or across one or more boundaries associated with the plurality of compartments and to prevent storing of sensitive data at a non-sensitive memory location; and
copy data in between compartment the one or more boundaries; and
reducing sensitivity from sensitive data type to non-sensitive data type when sensitive data is transformed by binary operation;
wherein sensitive data is identified as a function of one or more of sensitive type annotation or a sensitive data annotation associated with an accessed data.

24. The method of claim 23, wherein each of the one or more elements of the computer program is defined to facilitate compartmentalization.

25. The method of claim 24, further comprising propagating sensitivity by removing sandboxed code into a compartment authorized to access sensitive data.

26. The method of claim 23, wherein a core portion of the computer program is separated in a normal mode and wherein data is separated into a plurality of sets as a function of data sensitivity and wherein a non-core portion of the computer program is compiled in a sandboxed mode and wherein the data compartmentalized in the sandboxed mode is prevented from accessing sensitive data compartmentalized in normal mode.

27. The method of claim 23, further comprising generating code to deep copy data from a sensitive memory region.

\* \* \* \* \*